Aug. 6, 1963 S. N. McCULLOUGH 3,100,277
SWITCHING SERVO SYSTEM WITH ANTI-HUNT FEEDBACK
Filed Sept. 8, 1958 5 Sheets-Sheet 4

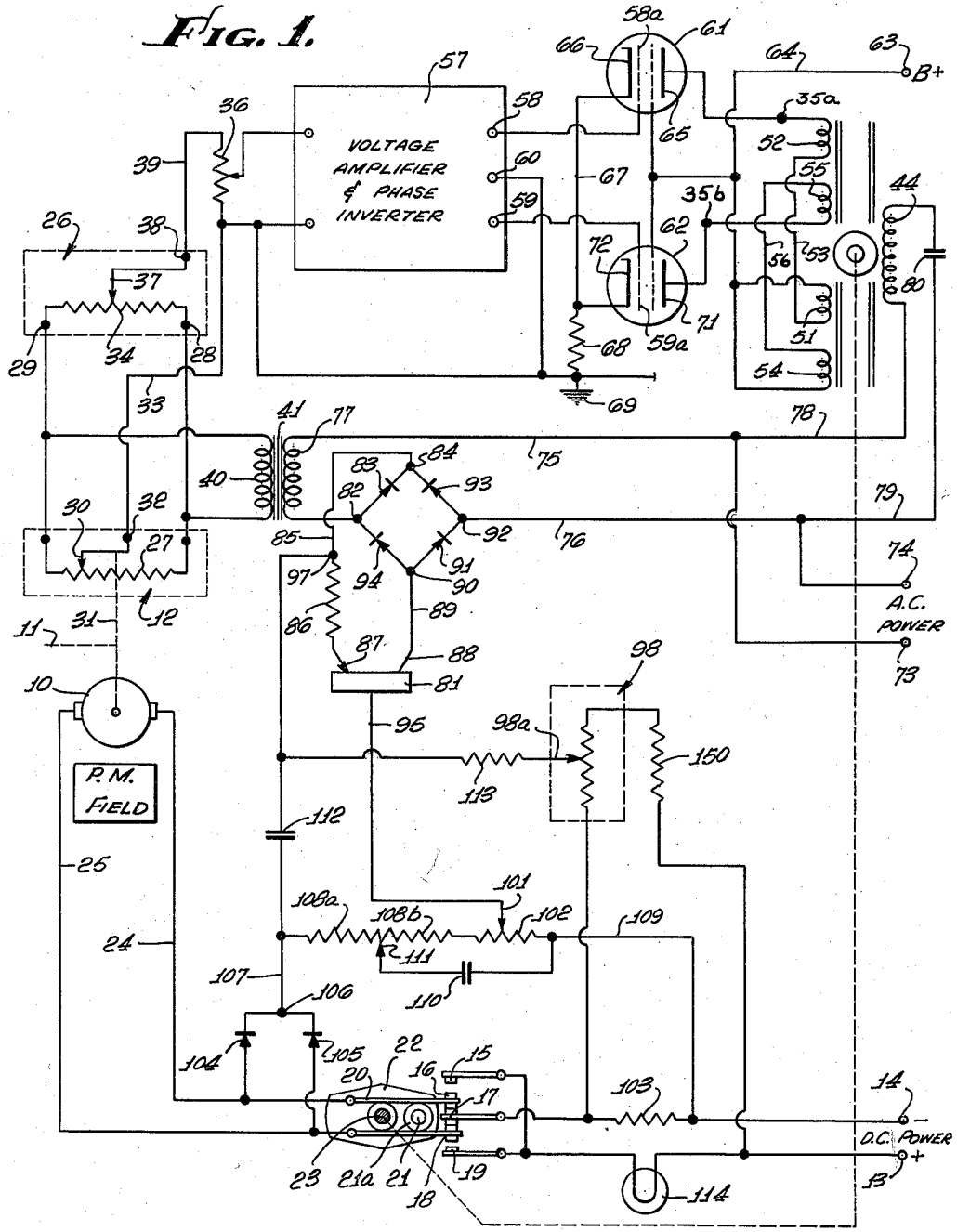

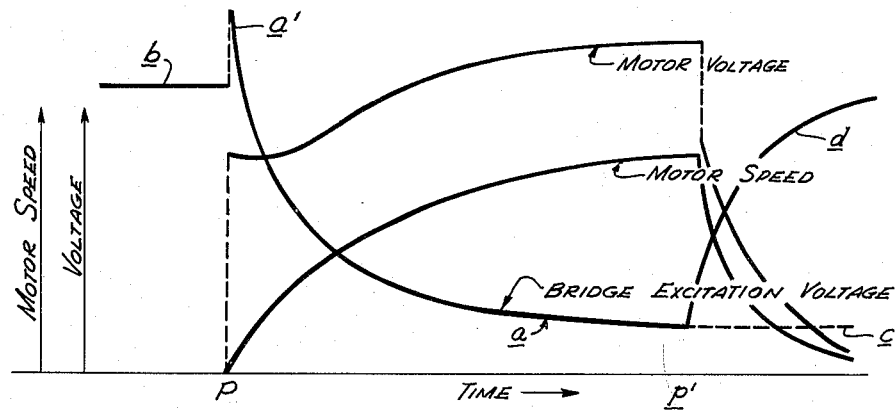
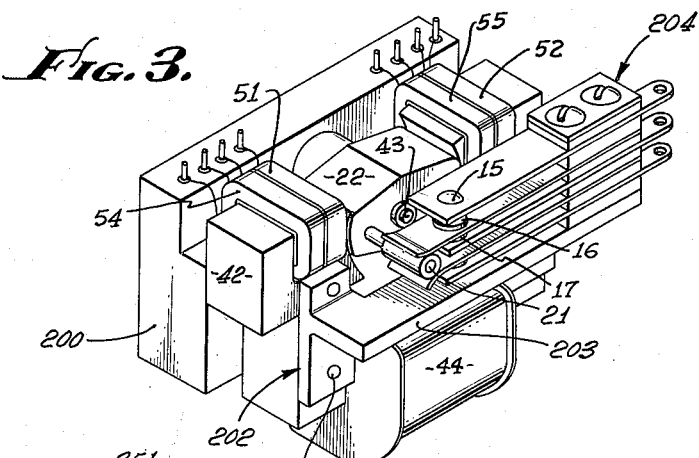
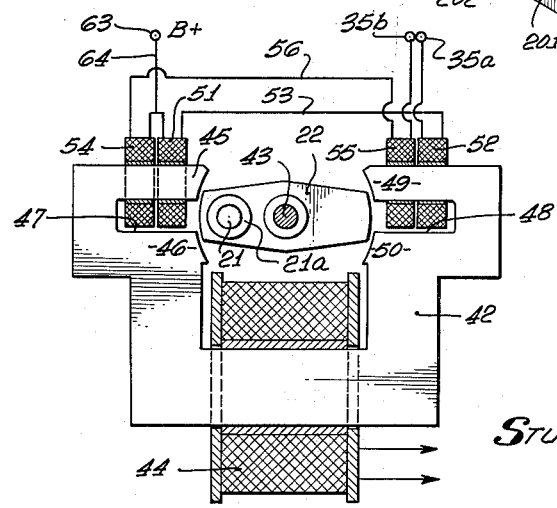

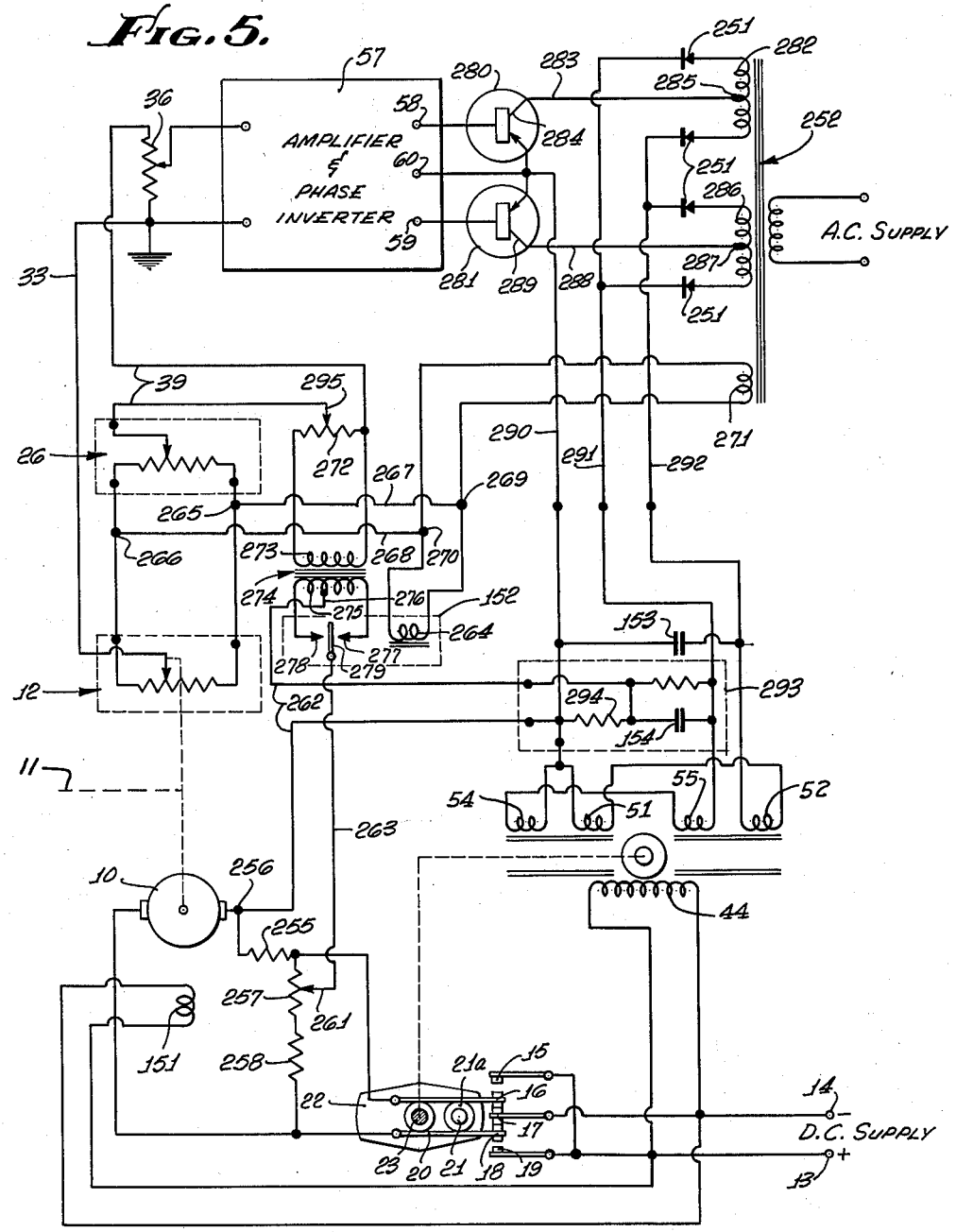

INVENTOR.
STUART N. McCULLOUGH
BY Flam and Flam
ATTORNEYS.

Aug. 6, 1963 S. N. McCULLOUGH 3,100,277
SWITCHING SERVO SYSTEM WITH ANTI-HUNT FEEDBACK
Filed Sept. 8, 1958 5 Sheets-Sheet 5

INVENTOR.
STUART N. McCULLOUGH
BY
Flam and Flam
ATTORNEYS.

United States Patent Office 3,100,277
Patented Aug. 6, 1963

3,100,277
SWITCHING SERVO SYSTEM WITH ANTI-HUNT
FEEDBACK
Stuart N. McCullough, 18093 Karen Ave., Encino, Calif.
Filed Sept. 8, 1958, Ser. No. 759,629
12 Claims. (Cl. 318—28)

This invention relates to servo systems, and particularly to servo systems of the on-off type.

Servo systems of the on-off type have been relatively neglected as compared with non-discontinuous systems. Such on-off systems are characterized by a relay or other device which abruptly causes motor operation upon the existence of a sufficient error signal.

On-off servo systems have numerous advantages which have been recognized for many years. Thus, in a proportional servo system where motor torque is proportional to error, the static accuracy necessarily depends upon the load on the motor. But in an on-off system utilizing a relay, the starting of the servo motor is assured by the minimum signal required to operate the relay. Critical control can be provided by a relay such that an extremely sensitive device is possible. The relay may be operated by either A.C. or D.C. signals and serve to control either A.C. or D.C. power in another circuit, which offers a distinct advantage to the servo designer. Furthermore, and perhaps most important, components in an on-off system may be fairly light in weight, which is no small consideration in airborne equipment, for example. Efficiencies of a high order may generally be obtained, and stand-by power requirements are small.

The present invention is intended basically to provide an on-off servo system that incorporates precision and high-grade control features that thus far have been incorporated only in servo systems free of discontinuities. This is made possible by overcoming problems that are unique to on-off servo systems, such as relays and the like.

In my copending application, Serial No. 360,724, now abandoned, there is disclosed and claimed a five-position relay structure that in effect provides a series of four individual discontinuities in the operation of the output device in place of the one or two abrupt discontinuities necessarily inherent in relay operations in the past. Thus, there are five positions corresponding to energize forward, coast forward, brake, coast reverse and energize reverse. The five positions are obtained in proper sequence in response to a single input signal. This series of less violent discontinuities approaches continuity. Hence, a five-position relay achieves, to a substantial extent, some of the performance characteristics of the continuous power output devices. At the same time, the inherent advantages of the on-off system are retained. Conventional relay servos of two or three positions, on the contrary, do not permit both coasting and braking, essential to smooth operation.

An object of this invention is to carry forward the basic idea set forth in said copending application and to further perfect servo systems of the on-off type by anticipating and overcoming the unique problems involved.

The performance of a servo system is usually specified in terms of static and dynamic accuracies. Static sensitivity will determine what static error is tolerable to the servo. In servos using electromechanical relays, a relay armature must move to a contacting position, which it normally does not occupy, in order to close a circuit for a motor. A time delay is thus inherent since an armature has inertia and the force available to move the armature is limited by requirements of space and weight. There is thus an inherent disadvantage in a relay servo in that there is an additional physical device which requires a certain time for operation.

A primary object of this invention is to provide an improved relay structure which is capable of very fast operation whereby performance as above defined can be vastly improved.

Another object of this invention is to provide a practical relay structure wherein parts can be readily replaced and whereby a novel arrangement makes it possible to minimize the length of the magnetic circuit, the inertia of the moving parts and the inductance of the coils effecting control of the relay.

Another object of this invention is to provide an improved relay in which the contact position is a function of the signal input at any time and substantially independent of the previous signal input.

Another object of this invention is to provide a highly sensitive on-off servo system which attains high performance for wide ranges of errors.

If an error is small, measured, say, in terms of the numbers of revolutions of a motor required to correct the error, and if the servo system is intended to be substantially sensitive, the system gain must be substantial. The reason for this is that it takes a certain force for the relay contacts to be held away from the neutral position and into a contacting position, causing energization of the motor. This force is required whether the error is small or large, and the force available is proportional to the product of error and system gain. Hence, it is obvious that for small errors the gain must be substantial in order that the contact pressure is developed. Otherwise, sensitivity is sacrificed, or the "dead zone" is broadened.

If the error is large and if the control point itself is not changing at a speed nearly comparable with the speed of the motor, obviously there is a problem as to how to dissipate the kinetic energy of the motor. It can be done, as some have, by stopping the motor very suddenly by a fast-operating brake just as the balance point is about to be reached. Performance in such a system is good for a limited class of positioning to rest applications, but smooth, rapid reversals are difficult to achieve and frequent operations tend to overheat some components. Optionally, a sluggish, virtually self-braking motor can be used; but obviously, system response and efficiency are sacrificed.

An important object of this invention is to provide novel and simple arrangements that will modify system gain automatically to meet various requirements. Gain is reduced in a novel manner primarily as a function of time of operation of the motor.

In another example, the balance point is displaced in a novel way as a function of motor speed in a manner equivalent to velocity feedback from a tachometer generator, but without requiring any rotating parts adding inertia.

As in my copending application, I deenergize the motor in advance of the balance point, and permit the kinetic energy to be utilized while permitting the motor to coast. Causing the motor to deenergize in advance of the balance point for large errors is accomplished in one example of my invention by reducing system gain materially below that which is used for correcting small errors. This means, for large errors, contact opening and deenergization, the motor kinetic energy now being available to carry the motor to the balance point. At the same time, the gain must not be increased immediately upon opening of the contacts, for otherwise the contacts of a fast relay will close just as for a small error. An object of the present invention is to provide circuitry or equivalent means that will closely approximate the desired continuous, as distinguished from abrupt, gain reduction throughout the entire acceleration transient of the motor or actuator. Dynamic braking takes place as required, occurring only near the balance point with the variable gain circuitry but as desired in advance of the balance point with velocity feedback circuitry. Weight savings are involved in utilizing dynamic braking over other methods.

My gain control networks are specifically adapted to mitigate certain problems in the operation of an on-off system. For example, immediate gain reduction at the instant of motor energization creates a problem for small errors. Motors have limited accelerations and cannot immediately acquire a finite speed. Dropping gain instantaneously upon initial energization would mean that the error necessary to keep the relay closed must be immediately increased. But the error hasn't increased; hence, the contacts open. Restoration of gain again makes a smaller error sufficient to cause relay contact closure. Cyclic operation will result with contact burning and slow motor movement, the motor rotor slowly gravitating toward the intended control point. In a slow acting relay, the problem may not arise because, by the time the relay moves from contacting position in response to a signal which directs that it so moves, the motor has moved a distance necessary to correct the error or a substantial part of it.

Another object of this invention is to provide a novel system, including a novel power relay arrangement, for use of a three-phase induction motor as a servo motor.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a circuit diagram illustrating one circuit arrangement incorporating my invention and for use with the improved relay structure;

FIG. 2 is a graph illustrating the gain and other characteristics of the circuit illustrated in FIG. 1;

FIG. 3 is a pictorial view showing the new relay structure incorporating my invention;

FIG. 4 is a diagrammatic view showing the magnetic circuit of the relay structure;

FIG. 5 is a circuit diagram similar to FIG. 1, but illustrating a modified circuit structure utilizing velocity feedback as a method of stabilization;

Figure 6:
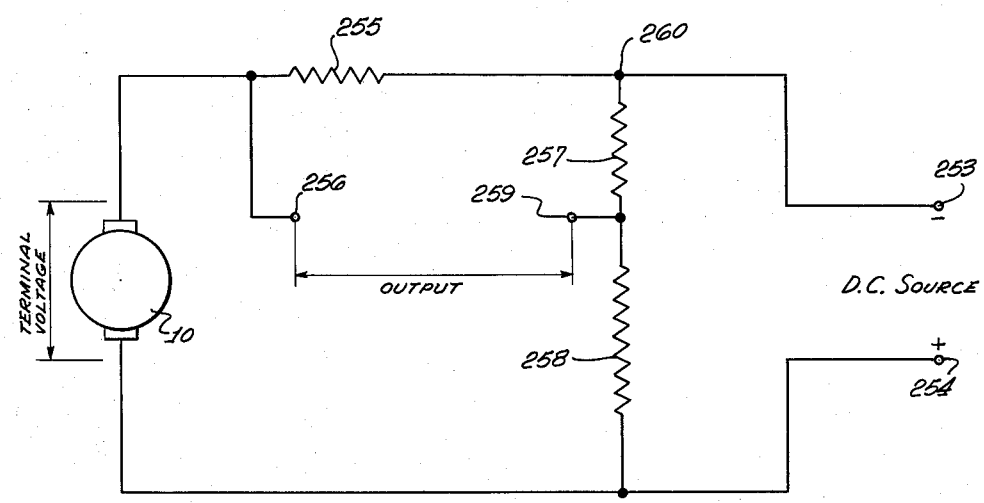
FIG. 6 is a diagrammatic view indicating the manner in which a motor velocity function is obtained in FIG. 5.

In FIG. 1, a D.C. actuator in the form of a shunt motor 10 drives a load or movable instrumentality, as indicated by the dotted line 11. Also coupled to the motor 10 in conventional fashion is a slaved potentiometer 12 forming a part of a servo system input device and to be described more fully hereinafter. The motor 10 derives energization from a D.C. source indicated diagrammatically by positive and negative terminals 13 and 14 at the lower right-hand corner of FIG. 1.

Five relay contacts 15, 16, 17, 18 and 19 are so arranged with respect to a relay armature that the motor 10 can be energized for movement in opposite directions or for coasting or for dynamic braking by short-circuiting the armature. The contact arrangement is the same as that illustrated in my copending application, Serial No. 360,724.

The outer contacts 15 and 19 are both stationary, and connected to one D.C. terminal 13. The central contact 17 is also stationary, and is connected to the other D.C. terminal 14.

The contact 16 is connected to one side of the motor, and may engage either an outer contact 15 or the central contact 17. The contact is mounted upon a flexible spring 20 for such movement.

The contact 18 is symmetrically located and connected to the other side of the motor. It extends between the other outer contact 19 and the central contact 17.

Depending upon the position of the contacts 16 and 18, various modes of operation of the motor are achieved.

A pin 21 moves the contacts 16 and 18 so that, as the pin moves toward neutral in one direction, starting from a displaced condition, the operational modes are: (1) energize forward, (2) coast, (3) braking at the neutral position. As the pin moves toward neutral in the other direction, the symmetrical operational modes are determined. The pin is carried upon an angularly movable relay armature 22 (see FIG. 3) which, in turn, is mounted for angular movement about an axis 23. The pin 21, enclosed by an insulating sleeve 21a and located eccentrically of this axis 23, projects between the spring mounting the contacts 16 and 18 which tend to restore the pin to a neutral position. In this position, contacts 16 and 18 connect to the same point, and hence to each other. Should the motor be rotating, the generated voltages cause heavy currents to flow, and dynamic braking is accomplished.

If the pin 21 is moved upwardly a slight distance, the contact 16 floats between stationary contacts 15 and 17. The armature circuit is interrupted and dynamic braking cannot exist. The relay is accordingly in coast position. If the motor contact 16 is caused to engage the outer contact 15, the motor rotates in one direction, say, for example, in a counterclockwise direction, the respective armature leads 24 and 25 now being connected to the plus and minus terminals 13 and 14 respectively. Should the armature 22 rotate the pin 21 in the opposite direction, there will be an intermediate coast position and an energization position in which the contact 18 will engage contact 19. In this case, the motor 10 will be energized for rotation in the opposite direction, the respective armature leads 24 and 25 now being connected to the minus and plus terminals 14 and 13 respectively.

The armature 22 is moved in response to unbalance in a bridge circuit in which the slaved potentiometer 12 forms a part. A master potentiometer 26 forms the other part of this bridge circuit. It may be operated manually or in response to a sensing or controlling device.

As the motor 10 moves the load between its extremes, a slider 30 is correspondingly (or proportionately) shifted along the resistance 27. An electrical measurement is accordingly available to determine the position of the load. A connection 31 diagrammatically illustrates the synchronization between the load 11 and the slider 30. The slider 30 connects to a control lead 33 by the aid of a terminal 32.

The master potentiometer 26 includes a resistance 34 connected between the power terminals 28 and 29. A slider 37 via a terminal 38 connects to a control lead 39.

A secondary winding 40 of a transformer 41 (to be described more fully hereinafter) applies A.C. voltage across the power terminals 28 and 29.

If the slaved and master sliders 30 and 37 are at corresponding positions along their resistances 27 and 34, they will both be at the same A.C. potential, and no signal will occur between the control leads 33 and 39. If the slaved slider 30 is displaced relative to the slider 37 (corresponding to a position error), a signal will occur between the control leads 33 and 39 in amplitude and phase respectively in accordance with the extent and relative direction of error. Accordingly, an error signal is derived that is a direct function of error. It is also a function of voltage applied to the power terminals 28 and 29.

The error signal, if sufficient, will cause the relay armature to move, appropriately to cause motor energization. This will be described in detail. But first the details of the relay itself must be described.

The relay structure, shown most clearly in FIGS. 3 and 4, comprises a stator or frame consisting of a series of stacked laminations 42, generally of U configuration.

The laminations provide two legs at the ends of which poles are formed. The poles extend on opposite sides of the armature 22, thereby completing a magnetic circuit across the armature. The poles of armature 22 are capable of being respectively simultaneously centered with respect to the poles of the stator laminations. In this instance, the mounting shaft 43 for the armature 22 lies centrally between and in line with the axis of the poles; hence, the armature itself is essentially aligned between opposite stator poles. Limited movement of the armature does not noticeably change the reluctance of the magnetic circuit through the armature.

The laminations 42 are affixed to a non-magnetic mounting base 200 by the aid of screws 201, one end lamination engaging the base. The mounting base 200 also mounts the armature shaft 43. An outboard bracket 202 engages the other end of lamination stack 42 and is affixed by the screws 201 which pass through lamination stack 42. The bracket 202 provides a ledge 203 on which the contact assembly 204 is appropriately mounted.

A coil 44, wound upon the central connecting portion of the magnetic core, provides excitation for the magnetic structure. The armature 22 normally aligns itself with the reference flux provided by the coil 44. It thus extends symmetrically with respect to the pole structures. This orientation corresponds to the contact position illustrated in FIG. 1. Unless this normal condition is disturbed, the motor 10 accordingly will be braked.

In order to alter this normal orientation of the armature 22, each pole is divided into two parts. The left-hand pole, for example, is divided into two angularly adjacent upper and lower parts 45 and 46 by a slot 47 extending inwardly from the pole face in a direction parallel to the main flux. A slot 48 divides the right-hand pole into corresponding parts 49 and 50. Should a flux be increased at the pole part 45, an asymmetrical imbalance will be created, and the center of flux will be shifted upwardly. The armature 22 accordingly will align itself with the new flux distribution and it will move in a clockwise direction. Such movement, depending upon the extent that flux is displaced from the quiescent axis, will either disconnect the short-circuited armature or actually connect the armature to the D.C. power terminals 13 and 14 for one direction of motor movement.

If the flux is diminished in the other upper pole part 49, the result will be the same so far as movement of the armature 22 is concerned. The lower pole part 50 of the set 49—50 will now predominate and the tendency will be for the armature 22 to align itself with this lower part 50, which it tends to do already by virtue of the flux in the pole part 45. Accordingly, a force is produced at each pole by displacing the flux of each pole such that activity in both air gaps contributes to the net useful torque. Coils 51 and 54 on the upper left-hand pole part 45 and coils 52 and 55 on the upper right-hand pole part 49 are provided for this purpose. Coils 51 and 52 are serially connected, as by a lead 53, but they are so wound and placed that if coil 51 adds to the main flux, coil 52 subtracts therefrom. Coils 54 and 55 are serially connected by a lead 56. These coils are also so wound and placed that when coil 54 subtracts from the main flux, coil 55 adds thereto.

The coil sets 51—52 and 54—55, if equally and simultaneously energized from an external source (as would be accomplished by a series-parallel connection, one terminal of which is terminal 63), will produce no net flux change since the coils 51—54 and 52—55 on each pole part are wound in opposition to each other when so connected and will, in this event, tend to produce balancing fluxes. However, if the coil sets are equally energized in magnitude of current but oppositely in phase at a frequency corresponding to the frequency of the main flux itself, a net flux change will be produced if either energizing current has a component in phase with the main flux, for, in this instance for example, the current in coils 51 and 54 at one pole will both be in phase with the main flux when the current in coils 52 and 55 at the other pole will both be out of phase with the main flux.

The required common frequency between the control coils and the main exciter coil is achieved simply by utilizing a common A.C. source indicated by terminals 73 and 74. This source drives the exciter coil 44 by the aid of leads 78 and 79. It also drives the primary 77 of the transformer 41 which supplies bridge excitation to provide an error signal. The error signal, via control leads 33 and 39 and amplifier 57 (which includes a phase inverter), controls push-pull circuits for the control coils 51—55 and 52—54 respectively.

The circuit for the control windings 51 and 52 may be traced as follows: a plate current source indicated by terminal 63 (see FIGS. 1 and 4), lead 64, control winding 51, lead 53, control winding 52, terminal 35a, plate 65 of the tube 61, cathode 66 of the tube 61, a lead 67, a cathode load resistor 68, ground 69.

Similarly the circuit may be traced for the control winding set 54—55 as follows: B+ terminal 63, lead 64, winding 54, lead 56, winding 55, terminal 35b, plate 71 of the other tube 62, cathode 72, the load resistor 68 (which is common to both circuits) and the ground connection 69.

Push-pull output terminals 58, 59, 60 of the amplifier cause the respective control coil circuits to be "alternately" operable at the line frequency. This is accomplished by connections from the terminals 58 and 59 respectively to the grids 58a and 59a of the tubes 61 and 62.

The "alternate" operation of the control winding sets is, actually, a 180° phase relationship of alternating currents, the control grids being driven by A.C. voltages 180° out of phase.

The actual phase relationship between the A.C. currents in the control coils and the main flux obviously determines which pole part 45 or 49 reinforces the main flux while the other pole part opposes it. Hence, this phase relationship determines the direction of movement of the armature. The relay is accordingly phase sensitive. The magnitude of the A.C. component of currents in the control windings determines the magnitude of the net flux shift produced thereby, and hence the magnitude of the torque on the armature. Since the reluctance of the magnetic circuit through the armature is substantially constant, no compensation need be made for variations thereof.

In practice, the phase relationship approximates either 0° or 180° relative to the main flux, since the internal phase shifts through the system are substantially invariable. In other words, only an inversion is possible through the system as described, although the relay itelf may be controlled by progressive phase shift of a signal.

In order to provide substantially a 180° or a 0° relative shift and not, say 97° or 277°, the phase displacement of the main flux from the voltage of the A.C. source must be either equal to the phase displacement from the voltage of the A.C. source of the current in the control windings or 180° related thereto. This is achieved by a condenser 80 in the lead to the exciter coil which compensates for the approximate 90° lag in the main relay flux behind the voltage applied to the exciter coil to cause it. Obviously, other phase alignment devices could be used and at other places in either of the respective circuits.

The phase of the current of the control windings (which determines the direction of movement of the armature, and thus the mode of circuit connection of the motor 10, and thus the direction of movement of the load) reverses relative to the main flux (or exciter current) when the error signal reverses in phase. Such reversal of error signal in effect interchanges the phase of the voltage appearing at output terminals 58 and 59, and the phase of the push-pull output to the control windings of the relay.

Thus, should the slider 30 be electrically farther from terminal 29 (for example) than is the slider 37, the error signal will be of one phase relative to the source and the main flux. But if the slider 30 is electrically nearer the terminal 29, the error signal will be of the opposite phase. Hence, the armature moves in a direction corresponding to the direction of the error, and correction can be achieved.

The magnitude of the error signal applied to the amplifier 57 determines the swing of the grids 58a and 59a, and hence the amplitude of the A.C. currents in the control windings, and hence the magnitude of the flux shift, and thus the torque available to cause contact closure. Accordingly, a relay structure senses direction and magnitude of an error. Upon sufficient control winding current, the relay causes the motor to operate in a direction to correct the error; for a smaller current, the motor is caused to coast; and for a still smaller current, the motor is braked.

To ensure optimum relay response, it is essential that the flux in the main magnetic circuit be redistributed promptly in response to an error signal. The laminated field structure ensures this result. The inertia of the armature 22 is small and it quickly follows the shift in flux distribution. The laminations, of course, also minimize heating upon A.C. excitation. The armature 22 is itself unlaminated. There is no necessity that the flux therein change its path since the armature as a whole moves to prevent such redistribution. Eddy current losses furthermore are actually desirable in order to achieve damping.

The laminations 42 are secured together to form a unitary structure before the coil 44 is wound thereon. While the magnetic structure could be split to provide for the insertion and removal of a complete coil, this would make it difficult to hold small air gap tolerances. Obviously a minimum air gap is desired for the purpose of maximizing the available torque for a given field excitation.

The separate coils 51, 52, 54 and 55 can be removed from the pole parts 45 and 49 without disturbing the main exciter coil 44. This is made possible in a short magnetic circuit by the split pole structure. Thus, the coil 44 may extend quite close to the lower pole parts 46 and 50 without preventing removal of the coils 51, 52, 54 and 55. The exciter coil, however, cannot interfere with the required movement of the armature 22. But this criterion is not difficult to observe.

Since the control windings or coils 51, 52, 54 and 55 do not extend about the entire poles, the vertical legs of the laminations 42 can adjoin areas quite close to the pole face proper. If, on the contrary, control windings were wound upon the entire poles, the vertical legs of the laminations would of necessity have to be moved outwardly. An effective short magnetic circuit is, accordingly, provided by the present structure.

In the present organization, each and every one of the coils 51, 52, 54 and 55 performs work so far as shifting the flux is concerned. Ample contact pressure is produced.

Voltages induced in coils 51—52, for example, of one set by the main flux precisely cancel out when the rotor is centered. The operation of the push-pull output is, accordingly, improved.

The necessity for modifying the gain of the servo system has been discussed previously. The gain should be modified as a function of motor speed and rate of change of error. If the control point is not moving at a fast rate, rate of change of error is not a significant factor, and motor speed alone becomes significant. A gain control or gain variation can be interposed anywhere in the closed loop. The gain variation may be made to take place, for example, in the push-pull circuit driving the control winding sets. Thus, a certain control signal may be made to have more or less effect upon conduction of the tubes 61 and 62.

In the present instance, the automatic gain control of the gain variation is achieved by varying the energization of the bridge from the transformer secondary winding 40. This has the advantages of minimizing transient disturbances within the amplifier and minimizing the size of the push-pull output stage. A variable circuit element 81 is inserted into the circuit for the primary winding 77. In this instance, the circuit element 81 is a transistor that has voltage and current characteristics well adapted for use in this servo system.

A transistor, with conventional signal input connection to base and emitter, does not exhibit the same characteristics in both directions. Hence, it cannot be inserted directly into an A.C. circuit and simply used as a variable impedance. A transistor bridge could be provided but, in order to minimize the number of transistors and complication associated with providing each transistor with a suitable signal input, a full wave bridge is provided that rectifies the alternating current in primary winding 77 to provide a direct current output for the single transistor 81. Thus, if the terminal 73 is at the moment positive, current will flow from a terminal 82 through diode 83, terminal 84, lead 85, emitter follower resistor 86, emitter 87, collector 88, lead 89, terminal 90, diode 91 to terminal 92 at the other side of the diode network to the A.C. power terminal 74.

Other diodes 93 and 94 complement the diodes 83 and 91 for the alternate half-cycles. Thus, when the terminal 74 is relatively positive, the circuit through the transistor 81 and transformer primary 77 can be traced as follows: lead 76, terminal 92, diode 93, terminal 84, connection 85, resistor 86, emitter 87, collector 88, connection 89, terminal 90, diode 94, terminal 82, primary winding 77 and lead 75 to the A.C. power terminal 73.

The conductivity of the transistor 81 is, of course, determined by the base current, that is, the current in the connection 95 to the base. This current is determined conveniently in this instance by a voltage applied across the base connection 95 and the emitter follower resistor 86. A terminal 97 is accessible at that side of the emitter follower resistor 86 remote from the emitter 87.

Under static deenergized conditions of the motor 10, a normal voltage (which may be adjusted) is applied between the lead 95 and the terminal 97. This normal voltage determines a normal conductivity of the transistor 81 and, hence, a normal gain of the servo system. This is indicated at b in FIG. 2 wherein gain or bridge excitation is plotted against time.

A potentiometer 98, connected to the D.C. source terminals 13, 14, has an adjustable tap 98a which connects with the transistor circuit terminal 97 through a resistor 113. The potentiometer 98 serves to adjust the normal voltage applied between lead 95 and terminal 97. A very low resistance resistor 103 is interposed between the D.C. power terminal 14 and the central contact 17 for purposes presently to be described, and a resistor 150 of much higher value is used to reduce the voltage applied to potentiometer 98.

The base lead 95 terminates in a tap 101 which adjustably engages a resistor 102. One side of the resistor is connected via lead 109 directly to the D.C. terminal 14. The other side of the resistor is open-circuited, at least with respect to direct current, during static conditions of deenergization of the motor 10, as will presently appear. Accordingly, the base is at this time at the potential of the D.C. terminal 14.

During energization of the motor, the voltage at the base lead 95 approaches more closely the voltage at the terminal 97. The conductivity of the transistor 81 diminishes, and less voltage is available at the primary winding 77 of the transformer 41; the excitation voltage applied to the bridge (comprising master and slaved potentiometers 26 and 12) is correspondingly diminished. In other words, the gain of the closed loop servo system is reduced.

A circuit depending upon engagement of either contact 15 or 19 is used for this purpose. The circuit includes the D.C. plus terminal 13, contact 15 for example, contact 16, lead 24, diode 104, a terminal 106, a lead 107, resistor 108a—108b, the resistor 102 with which the tap 101 is associated, the lead 109 to the D.C. terminal 14. The voltage at the tap 101 begins to change as soon as the motor circuit operates in either direction. For this purpose, a circuit is also provided between the lead 25 and the terminal 106 by a diode 105. This branch will be effective if the motor energization is in the opposite direction. The diodes 104 and 105 maintain the necessary electrical isolation of the motor leads 24 and 25 despite the connection of the same point 106 to both of these lines.

The slider 101 seeks an operating voltage above that of D.C. terminal 14 when the motor is energized, depending upon the adjustment of the slider 101. The bridge excitation voltage tends to approach the value $c$ (FIG. 2). But a capacitor 110, in shunt relationship both to the resistor 102 and a portion 108b of the serially adjoining resistor 108a—108b, determines the rate at which the voltage at slider 101 approaches this operating voltage. Thus, the capacitor 110 in effect limits the decay of system gain.

The curve $a$ in FIG. 2 shows the variation of the bridge excitation or gain as a function of time that is achieved by this control circuit, the point P indicating the time at which the contact 15 or 19 is first engaged, the steady state excitation being indicated by the straight line $b$ preceding the point P.

Due to limitations of space and weight, the acceleration of the motor 10 is finite. As discussed in the objects, a small error, although sufficient initially to cause contact closure, may not be sufficient to keep the contacts closed if the gain were diminished immediately. Thus, the motor, having finite acceleration, would have virtually no chance to move, its acceleration being other than infinite immediately upon energization (see FIG. 2). The result would be a rapid opening and closing of the relay contacts, probably with a creeping motor movement until, ultimately, correction might be obtained. To remedy this situation, force the contacts into tight engagement to prevent burning, and to allow a finite time for motor movement prior to gain decay which would open the contacts, a corrective voltage pulse is injected in the transistor circuit that more than offsets the initial decay of gain. This is indicated at $a'$ in FIG. 2. This is accomplished by a condenser 112 placed between the terminals 106 and 97 to the transistor. The condenser 112 momentarily boosts the voltage of the slider 98a and terminal 97. Thus, prior to contact closure, the lower plate of condenser 112 connects to the minus terminal 14 via resistors 108 and 102. The upper plate acquires a charge consistent with the voltage at the terminal 97. Upon contact closure, the lower plate of the condenser 112 is immediately placed at the potential of contacts 15 and 19 which substantially exceeds the previously existing potential on the upper plate of the condenser 112. Since the charge on the condenser cannot change instantaneously, the actual result is that the potential on the upper plate is correspondingly raised instantaneously. Immediately, currents begin to flow to or from the condenser 112 so that the condenser ultimately acts as an open circuit whereby the control of voltages is restored to the slider 98a. This condenser charging current substantially flows through resistor 113, the lower portion of potentiometer 98 and resistor 103, and the voltage drops thus produced appear between terminals 97 and 95. The time constant of this R-C circuit controls the relative duration of peak $a'$.

The gain as illustrated in FIG. 2 then decays substantially exponentially and approaches the value $c$ to the extent permitted prior to the contacts opening.

Since the control signal applied to the relay is proportional to the product of error signal and gain, it will be diminished sufficiently to permit motor deenergization quite quickly in the case of small errors, even if the error signal is unchanged due to lags in the system. In the case of larger errors, the gain decay transient must proceed further for the control signal applied to the relay to decrease sufficiently to permit deenergization of the motor. The gain decreases progressively throughout the acceleration transient of the motor to extend the desired relationship discussed in copending application Serial No. 360,724.

As the relay contact opens in advance of arrival at the control point, coasting operation of the motor is intended. The instant of coasting is indicated at time $p'$ in FIG. 2. If the gain rises abruptly immediately upon contact opening, the relay would again close before significant movement of the load. This would nullify the careful control of gain decay contemplated. Some time must be allowed for the error to be reduced significantly before the gain is fully restored. Hopefully, the motor coasts, generating a back E.M.F. which tends to maintain the current through resistor 102 and hold the gain depressed, and then is braked so that the load desirably arrives at the control point without contact reclosing. If gain were restored immediately upon motor deenergization, contact reclosing would depend (except for short open periods) only on the error and normal or steady state gain, and not upon motor speed.

The condenser 110 tends to maintain the voltage across the resistor 102 and the included resistor portion 108b. Hence, it tends to oppose voltage change and gain change upon contact opening. The time that it takes for the voltage at the slider 101 to return to the potential of the D.C. minus terminal 14 depends upon the time constant of the circuit including the condenser 110. The time constant may be adjusted by shifting of the slider 111 along the resistor 108a—108b.

The rate of gain rise can accordingly be controlled relative to the rate of gain decay. By including less resistance in the circuit, quicker restoration of gain is accomplished. The curve at $d$ indicates that it takes time for gain to be restored. The value $b$ is approached.

The resistor 103 develops a voltage that is proportional to motor current. This voltage is introduced into the control circuit for the transistor 81 by virtue of the fact that the potentiometer 98 connects to the D.C. terminal 14 only through this resistor. A gain modification proportional to motor current is accordingly obtained, if desired. This may compensate, for example, for motor loads that are not related to motor acceleration whereby the gain can more closely be a function of motor speed.

A variable resistor lamp 114 is included in the lead from the D.C. plus terminal 13. The effect of this lamp, as brought out in my copending application, is to limit motor acceleration so that sensitivity, for example, may be enhanced with the use of a relay with a finite operating time. Its use is optional, and contingent on the nature of the application.

In the form illustrated in FIG. 5, an arrangement generally similar to that illustrated in FIG. 1 is provided.

In the present instance, however, the relay structure is energized by direct current and the control windings 51, 52, 54 and 55 are likewise energized by direct current. An output circuit driven by the amplifier 57 modulates or controls the direct current in the control windings 51, 52, 54 and 55. In the present instance, rectifiers 251, to be described more fully hereinafter, cooperate with secondary windings of a transformer 252 by the aid of which the output control circuit can be excited by an A.C. supply and respond to an A.C. signal.

The armature of shunt motor 10 is controlled by contacts 15, 16, 17, 18 and 19, as in the previous form, its shunt field 151 being continuously energized by the D.C. supply. The motor repositions the load (as indicated by the dotted line 11) until the slaved potentiometer 12 is in a position corresponding to that of the master potentiometer 26.

The circuit in this instance is designed for use with loads of substantial inertia.

In the form previously described, transient characteristics of an R-C circuit approximated the acceleration or deceleration of the motor. Accordingly, an indirect approximation of velocity was obtained for stabilization purposes. If, on the contrary, the load has relatively high inertia at least so far as the motor is concerned, acceleration and deceleration will be slower and more affected by variation of friction and other load components. Reverse energization or earlier dynamic braking of the motor may be necessary to stop the load in a reasonable distance. Accordingly, motor velocity is more directly approximated in the present example but without requiring a tachometer generator which would add to the inertia of the system. This permits much better compensation for load variations, and the velocity feedback connection permits dynamic braking well in advance of reaching the balance point.

In FIG. 6 there is illustrated a circuit for measuring the speed of the motor 10. The back electromotive force of the motor is a direct function of speed. Unfortunately this back electromotive force is inaccessible in that it cannot be measured directly across the terminals of motor 10. The terminal voltage, that is, the voltage across the motor terminals, may be considered to be the sum of the back electromotive force and a combination of resistance and inductance drops in the motor itself. The resistance drops are actually copper losses and brush losses. Unless the motor 10 is of a low voltage type, the resistance of the brush can be considered to be essentially constant. Inductance can be neglected as inconsequential in many applications. Knowing the terminal voltage of the motor 10, the induced back electromotive force can thus be calculated by a simple substraction operation providing the resistance drops are known.

In FIG. 6 the resistor 255 external to the motor terminals 10 develops a voltage that is proportional to the internal resistance drops of the motor 10 inasmuch as the same current flows through both, and both resistances are considered linear. For example, if the value of the resistor 255 is made to be one percent of the internal resistance of the motor, a voltage equal to one hundredth of the voltage due to the resistance drops within the motor appears across the resistance 255. If this value is substracted from the same proportion (one percent) of terminal voltage, the result is proportional to the back electromotive force. Resistor 255 can be made non-linear, if desired, to compensate for the non-linear brush resistance encountered sometimes. It can be placed in close proximity to the motor, and its temperature coefficient chosen so as to match the effects of motor temperature and resistance rise. It may also have inductance, if necessary, to compensate for inductance of the motor.

The resistor 257 provides a voltage equal to this same proportion of the motor terminal voltage. This is achieved by providing a ratio of ninety-nine to one in the values of the resistors 258 and 257, essentially the same voltage being applied across the voltage divider 257—258 as across the motor terminals, the resistance 255 being negligible. The voltage difference is obtained by measuring the voltage between the terminal 256 at the motor side of the resistor 255 and the terminal 259 between the resistors 257 and 258. In this connection, it must be remembered that current to the resistor 255 flows in the same direction relative to the terminal 260 as it does through the resistor 257. Hence, about the loop the two voltages subtract from each other.

In FIG. 5 the resistor 255, terminal 256, resistors 257, 258 are illustrated relative to relay contacts 16 and 18 as the source. An adjustable slider 261 cooperable with the resistor 257 is provided in place of the terminal 259, all for purposes of calibration. A lead 262 cooperates with the motor terminal 256, and another lead 263 cooperates with the slider 261. Between these two leads, a voltage proportional to induced voltage in the motor 10 is derived.

Due to the fact that motor losses are not constant, the voltage between the leads 262 and 263 for the circuit shown may not correspond to the induced voltage throughout the entire range of operation of the motor. But by calibration, the voltage can be made to correspond to the induced voltage or speed at one particular point.

It is most important from the standpoint of operation of the servo system that the voltage between the leads 262 and 263 be zero when the motor speed is zero. The feedback signal between the leads 262 and 263 must change polarity instantaneously upon motor reversal. Otherwise, the energization circuits of the motor will be controlled in a manner suggesting that it seek a position differing slightly from the balance point, and damping will thus be adversely affected. Performance accordingly will be sacrified unless this calibration is made. It is for this reason that the slider 261 is provided. Calibration is accomplished by locking the motor armature in position and applying a limited test current. Calibration is achieved simply by moving the slider 261 until no voltage appears between the feedback leads 262 and 263.

In the present example, excitation for the bridge potentiometers 12 and 26 is provided by an alternating current supply so that a simple alternating curernt signal is available to the amplifier 57. The signal between the feedback leads 262 and 263, however, is a direct current signal. This direct curent signal is inverted for insertion into the bridge circuits by the aid of a chopper 152 with its coil 264 excited in phase with the bridge potentiometers 12 and 26. Excitation terminals 265 and 266 for the bridge potentiometers 12 and 26 parallel the chopper coil 264 for this purpose, and as indicated by leads 267 and 268 respectively to terminals 269 and 270 across which the coil leads are connected. The terminals 269 and 270 are supplied with excitation from a secondary coil 271 of a transformer 252.

The control lead 39 from the master potentiometer 26 and the control lead 33 from the slaved potentiometer 12 drive the amplifier 57 through a manually adjustable gain control 36, as in the previous form.

In the present instance, a feedback voltage is inserted in the bridge output rather than varying the bridge input. This is accomplished by a resistor 272, a portion of which is inserted into the control lead 39 from the master potentiometer 26. The resistor 272 and the secondary winding 273 of the transformer 274 form a closed circuit. The voltage introduced into the control lead 39 will depend upon the extent that the secondary winding 273 is energized. This, in turn, depends upon the extent that primary winding 275 of the transformer 274 is energized.

The primary winding 275 has a center tap 276 to which the feedback lead 262 is connected. The outer terminals of the primary winding 275 are connected to contacts 277 and 278 associated with an arm 279 of the chopper structure operated by the coil 264. The arm 279, in turn, is connected to the other feedback lead 263 from the feedback circuit. Energizing of the coil 264 causes the arm 279 to engage the contacts 277 and 278 in alternation. This produces, so far as the secondary 273 is concerned, an alternating current since currents are sent alternately from the outer terminals of the transformer to the center tap 276. An alternating voltage is accordingly induced in the secondary 273, the magnitude of which depends upon the magnitude of the direct current feedback signal at the leads 262 and 263.

The voltage inserted in the control lead 39 is accordingly directly proportional to the feedback signal. This voltage is either in phase or out of phase or additive or bucking, depending upon the polarity of the feedback signal at the leads 262 and 263. The inserted voltage in a manner equivalent to that of a tachometer generator feedback tends to shift the apparent balance point of the bridge circuit so that appropriate energization of the motor is achieved.

The extent that motor velocity affects the apparent balance point is controlled in this instance by a slider 295 which contacts resistor 272.

The output circuits from the amplifier 57 may now be considered. Two transistors 280 and 281 are permitted to conduct in alternation in accordance with the output at the amplifier terminals 58 and 59. A center tapped secondary winding 282 of the transformer 252 provides source voltage for the output circuit associated with the transistor 280, a lead 283 extending from the collector 284 of the transistor 280 to the center tap 285 of the secondary 282. Similarly, a second secondary winding 286 has a center tap 287 connected by a lead 288 to the collector 289 of the other transistor 281. Ends of opposite phase of the respective secondary windings 282 and 286 are connected together via the blocking diodes or rectifiers 251.

There are three leads 290, 291 and 292 for the three relay terminals. The lead 290 forms a common return lead from the windings 51 and 54 on the pole part 45, for example, similar to the lead 64 described in connection with the previous form. The other leads 291 and 292 continue respectively from the joined ends of the secondaries 282 and 286 and connect respectively to the control windings 55 and 52. As before, the control windings 55 and 52 serially connect respectively with the control windings 54 and 51.

Assuming a half-cycle in which the upper terminals of the secondary windings 282 and 286 are positive so that current can flow through their respective diodes or rectifiers 251, and assuming further that at this instant the conductivity of the transistor 280 exceeds the conductivity of the transistor 281 (due to error in one direction), the operation will be as follows: current, via collector lead 283, upper half of transformer winding 282, lead 291, to the control windings 55 and 54, accordingly will exceed the current through collector lead 288, upper half of the secondary winding 286, its rectifier or diode 251, lead 292 to the other control winding pair 52 and 51. This will produce a torque on the relay armature 22 in one direction which appropriately corresponds to this error. During this half-cycle, the lower secondary halves are inoperative due to the blocking diodes 251.

During the next half-cycle, conductivity of the transistor 281 exceeds that of the transistor 280 due to phase reversal at the amplifier terminals 58 and 59. During this half-cycle, the current through the collector lead 288 associated with this transistor 281, center tap 287, the lower half of secondary winding 286, its diode or rectifier 251, lead 291 to the control windings 55 and 54, exceeds the current from collector lead 283, center tap 285, lower half of the winding 282, diode or rectifier 251, lead 292 to the control windings 52 and 51.

Accordingly, the transistors 280 and 281, with the use of the rectifiers 251, provide D.C. operation of the control winding sets 55—54 and 52—51 during both halves of the cycle. Since excitation voltage to the relay is by direct current, this ensures a torque for error in one direction.

The transformer secondaries and the diodes form essentially a rectifying bridge for the D.C. windings 55—54 and 52—51.

A network 293, linking the relay input connections to feedback lead 262, introduces a small damping voltage derived from the relay coils. The condensers 153 and 154 help filter the D.C. impulses applied to the relay signal coils and aid in reducing vibration. The combination thus minimizes contact bounce, vibration and consequent burning.

Figure 7:
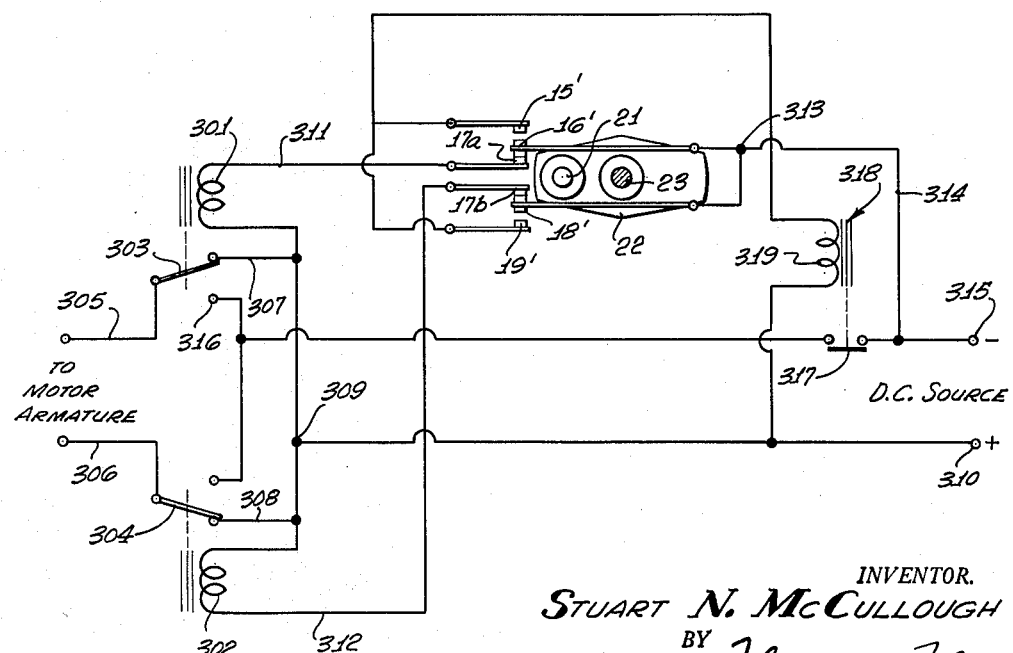
FIG. 7 is a diagrammatic view showing an arrangement in which the improved relay operates as a pilot to control main power relays for heavy equipment.

The small relay structure illustrated in FIG. 3 can be used to control relatively large currents to a large motor. For this purpose, the relay structure operates as a pilot relay which, in turn, operates power relays, the contacts and other structures of which have sufficient rating for the motor in question. One manner in which the relay may be used as a pilot relay for a large D.C. motor is indicated diagrammatically in FIG. 7.

In the present example, the relay provides six contacts 15', 16', 17a, 17b, 18' and 19'. The two power relay coils 301 and 302 are provided, respectively cooperating with contact arms 303 and 304 which, in turn, are connected to the leads 305 and 306 to the motor. Two separate energization circuits for the coils 301 and 302 are controlled at the central position of the relay. Hence, two contacts 17a and 17b are provided instead of one.

One side of each of the relay coils 301 and 302 is connected to a terminal 309 and one D.C. source terminal 310. The other sides of the relay coils 301 and 302 are respectively connected, as by leads 311 and 312, to the central contacts 17a and 17b of the pilot relay structure. These contacts are respectively engaged by the intermediate moving contacts 16' and 18' of the pilot relay. These contacts respectively connect together at a terminal 313 and via a lead 314 to the other D.C. power terminal 315. Accordingly, in the position indicated, circuits are established for the coils 301 and 302, and the arms 303 and 304 both engage their normally open contacts 307 and 308. These contacts are connected to each other via the terminal 309 and incidentally to one terminal 310 of a D.C. source. The motor leads 305 and 306 accordingly are connected together, and dynamic braking is achieved.

As the pilot relay armature 22 responds to error in one direction, the contact 16', for example, moves away from the contact 17a. The circuit for the coil 301 and dynamic braking are accordingly interrupted. The arm 303 previously engaging the contact 307 now engages a normally closed contact 316. This contact 316 is connected to the other D.C. terminal 315 upon closure of the normally open relay contacts 317 of a relay structure 318. Since the relay 318 is open, there is no energization applied to the motor leads 305 and 306. This corresponds to a coast position.

Should the contact 16' be moved farther, corresponding to a large error signal, the contact 15' is engaged. Engagement of the contact 15' causes the relay 318 to operate and the connection between the motor lead 305 and the terminal 315 to be effective via arm 303 and contact 316. This corresponds, for example, to energization for a forward direction.

The relay 318 has a coil 319 one side of which is connected to the D.C. terminal 310. Its other side is connected to the outside contacts 15' and 19'. Upon engagement of contact 15' by the movable contact 16', a circuit is completed to the opposite D.C. terminal 315 via lead 314.

Should the relay 22 be positioned oppositely, it will be apparent that the terminal 310 will be connected in this instance to the lead 305, and the D.C. terminal 315 in this instance will be connected to the other motor lead 306. Thus, the power relay coil 301 will be maintained energized and the lead 305 accordingly will be connected to the D.C. terminal 301. The other coil 302 will be deenergized and the lead 306 in this instance will be conditionally connectible to the other D.C. terminal 315. Before the relay 317 is operative, coasting of course is established. As the contact 18' engages the contact 19', the relay coil 319 is again energized, whereby energization for motion in the opposite direction is achieved.

Either the variable gain circuit of FIG. 1 or the velocity feedback control system can be used in conjunction with the power relay circuits.

Figure 8:
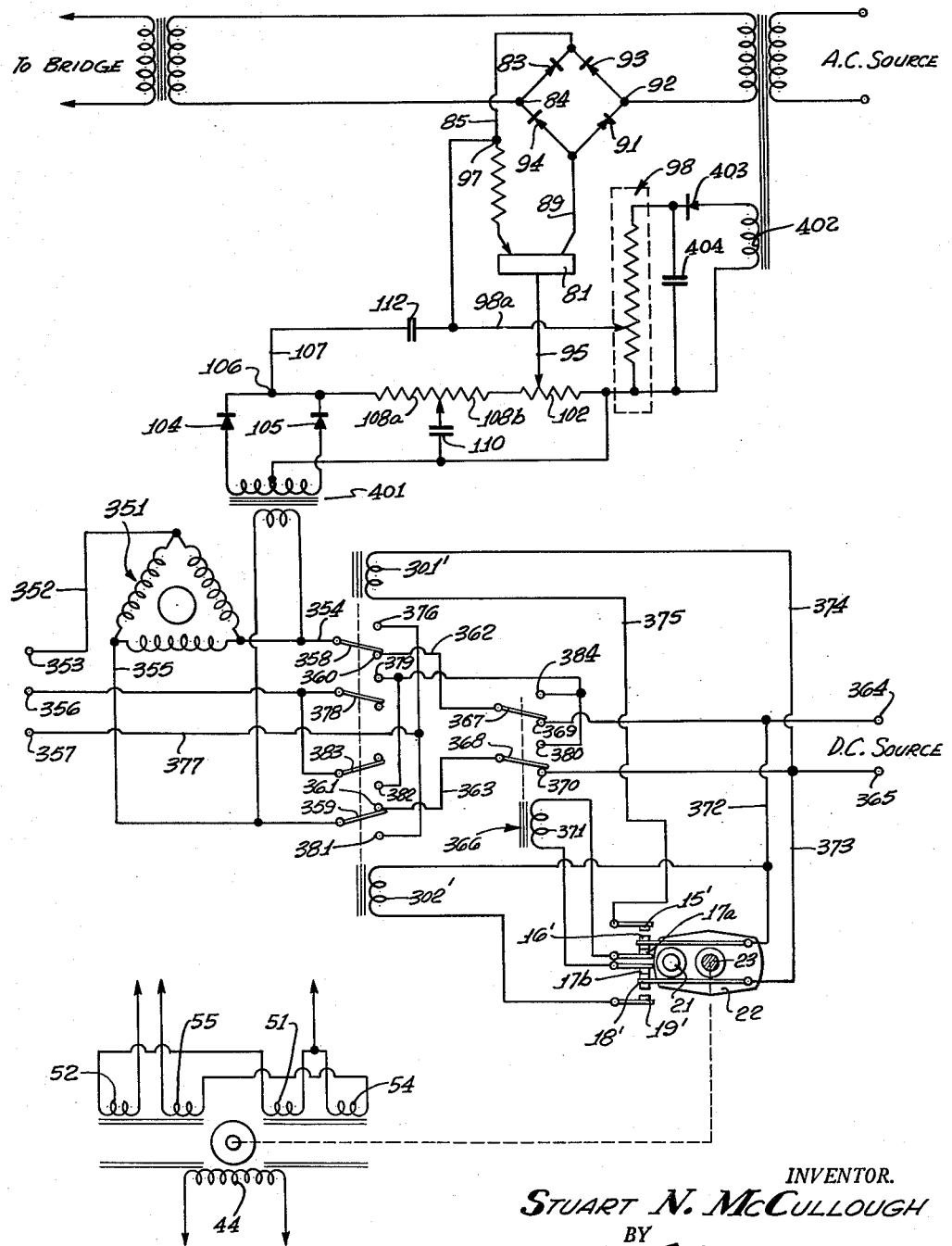
FIG. 8 is a circuit diagram similar to FIGS. 1 and 5, showing a further modified circuit arrangement for use with the relay structure, the characteristic feature being that a three-phase induction motor is utilized as a drive for the system.

In FIG. 8 the relay structure is illustrated operating, in this instance, a three-phase induction motor, the windings of which are diagrammatically illustrated at 351. This motor has acceleration and torque characteristics that are suitable for follow-up and positioning applications by appropriate design of resistance and leakage reactance of the squirrel-cage windings. Furthermore, if polyphase power is available, direct use of it is more economical than providing a D.C. power supply.

One lead 352 of the motor 351 is permanently connected to one terminal 353 of the three-phase power source. The other two leads 354 and 355 may be selectively connected to the other three-phase power terminals 356 and 357, depending upon the mode of operation of the pilot relay. Reversal of the connection of the leads 354 and 355 changes the direction of rotation of the motor.

By applying direction current to one winding of a three-phase induction motor, dynamic braking is obtained. Two symmetrical relays are provided, each having two contact sets or arms, one of which is a double throw, in addition to a third relay to control braking.

Arms 358 and 359, associated respectively with coils 301' and 302', are respectively connected to the motor leads 354 and 355. The relay coils 301' and 302' in this instance are deenergized when the control relay armature 22 is in a neutral position. The arms 358 and 359 respectively normally engage normally closed contacts 360 and 361. Leads 362 and 363 from these contacts 360 and 361 are adapted to be connected respectively to D.C. power terminals 364 and 365 but only when the armature 22 is in this neutral position and power coils 301' and 302' deenergized. For this purpose, a relay 366 is used. It has two arms 367 and 368 respectively connected to the leads 362 and 363 which engage contacts 369 and 370 connected respectively to the D.C. terminals 364 and 365 when the relay 366 is energized.

Energization for the coil 371 of the relay is provided by the aid of the central contacts 17a and 17b of the pilot or control relay. The coil 371 is connected across these contacts. The contacts 16' and 18' of the relay structure are respectively connected by leads 372 and 373 to the D.C. power terminals 364 and 365. Accordingly, in the neutral position illustrated, the coil 371 is energized; the arms 367 and 368 engage their normally open contacts; the D.C. terminals 364 and 365 connect to the arms 358 and 359 and the respective motor leads 354 and 355.

If the armature 22 is positioned away from the neutral position, the circuit for the coil 371 of the relay 366 is interrupted. The arms 367 and 368 move from the relay energized contacting position whereby D.C. energization of the motor windings is interrupted. This corresponds to a coast position. Should the armature 22 move further from neutral position, either one or the other of the power relay coils 301' or 302' is energized, depending upon the direction of movement of the armature 22. Movement of the armature 22 in one direction, for example, will cause the contact 16' to engage the contact 15'. The relay coil 301' is thereby energized. For this purpose, the coil 301' connects to one of the power terminals 365 by a lead 374 and the other side of the relay coil 301' connects to the contact 15' by a lead 375. The contact 16', as previously stated, connects to the other D.C. terminal 364 by a lead 372.

The motor lead 354 is connected to the power terminal 357 and the normally open contact 376, associated with the relay coil 301' and engaged by the arm 358, being connected directly to the power terminal 357 by a lead 377. The other lead 355 connects to the other power terminal 356 by the aid of a second arm 378 associated with the relay coil 301'. Thus, this arm 378 engages a normally open contact 379 which is connected via a normally closed contact 380 of the braking relay 366 and via arm 368 and lead 363, contact 361, arm 359 to the other motor lead 355.

Should the other relay 302' be energized, the connection of the motor leads 354 and 355 is interchanged with respect to the power terminals 356 and 357. Thus, the contact 381, similar to the contact 376, is engaged by the arm 359 associated with the power relay coil 302' upon energization of the relay coil 302'. The contact 381, like the contact 376, directly connects to the three-phase power terminal 357. Accordingly, the lead 355 is, in this instance, connected thereto. A normally open contact 382, engaged by a second arm 383 associated with the relay coil 302', connects the other three-phase power terminal 356 to the other motor lead 354. A circuit for this may be traced as follows: three-phase power terminal 356, arm 383, contact 382, contact 384 engaged by a second arm 367 of the braking relay 366, connection 362, contact 360, arm 358 to the lead 354.

A variable gain circuit essentially similar to that described in connection with FIG. 1 modifies the gain of the servo system. Other arrangements can, of course, be provided. A transformer 401 is used in conjunction with diodes 104 and 105 to provide the requisite D.C. signal resulting from motor energization at the terminal 106. A D.C. source for the potentiometer 98 is illustrated in this example as provided by a secondary winding 402, rectifier 403, and filter condenser 404. Otherwise, the variable gain circuit is substantially the same as in FIG. 1.

The inventor claims:

1. In a closed loop system for positioning a movable instrumentality to correct an error of departure from a desired condition, said error being an input to a suitable error sensing element which has as an output an electrical signal indicative of such error, said signal increasing in magnitude with increase in said error, a circuit connecting said output of said sensing element to an input to an on-off power controlling device, said power controlling device operating in response to said signal to effect on-off energization and deenergization of an input of an actuator with power derived from a power source of suitable characteristics, said actuator being adapted to operate as a result of such energization to position said movable instrumentality and thereby cause a reduction of said error, the improvement comprising: means operable upon energization of said actuator input for effecting, substantially throughout the acceleration transient of the actuator, and as a function of time of continued energization of said actuator, continuously diminishing gain of that portion of the system serving to transmit the error and signal indicative of it from the instrumentality to the power controlling device, restoration of gain being postponed until the actuator is de-energized or starts to decelerate.

2. In a servo system: an input device for providing an error signal; a motor having an energizing circuit which includes an on-off power controlling device, said power controlling device operating in response to said error signal; the operation of said motor moving an instrumentality, which motion affects said input device and said error signal; a network providing electrical excitation for said input device; the error signal being dependent upon the magnitude of excitation; said network having variable transmission characteristics and being also connected to said motor energizing circuit and adapted to operate in such manner as to control excitation as a function of time and in response to voltages in said energizing circuit, such that excitation may be caused to progressively diminish following energization of the motor and increase subsequent to de-energization of the motor, the gain of said system being proportional to said excitation and thus varied accordingly.

3. The combination as set forth in claim 1, in which gain change is accomplished by variable circuit means having an input circuit and an output circuit, said variable circuit means operating in response to voltages derived from an R-C circuit, the characteristic time transient of which is initiated upon energization of said motor for controlling the said input circuit for reducing system gain as a function of time of continued motor energization, and in accordance with the characteristics of said R-C circuit and said variable circuit element.

4. The combination as set forth in claim 3 together with circuit means superimposed upon said R-C circuit for providing a starting characteristic to said input circuit whereby actual decrease in gain is initially postponed in time, but nevertheless progresses continuously upon initial decrease.

5. The combination as set forth in claim 3 in which a second R-C circuit transient is initiated upon deenergization of said motor and controls said input circuit for limiting the time rate of increase in system gain.

6. The combination as set forth in claim 3 together with means providing an A.C. excitation circuit for said input device; said variable circuit means comprising a single transistor; and a rectifying bridge for inserting said transistor into said excitation circuit.

7. The combination as set forth in claim 2 in which said power controlling device comprises a relay, the magnitude of excitation critically determining its circuit making and breaking functions.

8. The combination as set forth in claim 3 in which the time constant of the gain diminishing means corresponds substantially to the acceleration time constant of said actuator in the system.

9. The combination as set forth in claim 2 in which said power controlling device comprises a relay having five circuit making and breaking positions; in which the motor is dependently connected to the relay for five successive conditions of operation, namely energize forward, coast, brake, coast and energize reverse; and in which the magnitude and polarity of said error signal determines the position of the relay from a central position corresponding to brake.

10. The combination as set forth in claim 2 together with means operative upon motor de-energization to restore, at a limited rate of build up, the gain of the system, and as a function of time of continued de-energization of said motor.

11. The combination as set forth in claim 10 in which the time constant of the gain diminishing characteristic corresponds substantially to the acceleration time constant of said motor in the system, and in which the time constant of the gain restoring characteristic corresponds to the deceleration time constant of said motor in the system.

12. The combination as set forth in claim 2 in which said network causes gain asymptotically to approach a finite value as it progressively diminishes.

References Cited in the file of this patent

UNITED STATES PATENTS

| | | |
|---|---|---|
| 2,115,086 | Riggs | Apr. 26, 1938 |
| 2,429,257 | Bond | Oct. 21, 1947 |
| 2,692,358 | Wild | Oct. 19, 1954 |
| 2,806,192 | Bristol | Sept. 10, 1957 |
| 2,826,726 | Mitchell | May 11, 1958 |
| 2,845,585 | Vicenzi et al. | July 29, 1958 |
| 2,863,102 | Zupa | Dec. 2, 1958 |
| 2,937,327 | Vossberg | May 17, 1960 |
| 2,939,066 | Crenshaw | May 31, 1960 |